(12) United States Patent
van Reitschote et al.

(10) Patent No.: US 8,510,505 B1
(45) Date of Patent: Aug. 13, 2013

(54) METHOD AND APPARATUS FOR A VIRTUAL STORAGE DEVICE

(75) Inventors: Hans van Reitschote, Sunnyvale, CA (US); Tommi Salli, Mountain View, CA (US); C W Hobbs, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 992 days.

(21) Appl. No.: 11/713,317

(22) Filed: Mar. 2, 2007

(51) Int. Cl.
*G06F 12/00* (2006.01)
*G06F 12/16* (2006.01)
*G06F 13/00* (2006.01)

(52) U.S. Cl.
USPC .... 711/113; 711/154; 711/161; 711/E12.092; 711/E12.08; 707/610

(58) Field of Classification Search
USPC .......... 711/113, 118, 154, 161, 162; 707/204
See application file for complete search history.

(56) References Cited

U.S. PATENT DOCUMENTS

| | | | | |
|---|---|---|---|---|
| 6,047,294 | A * | 4/2000 | Deshayes et al. | 707/204 |
| 6,405,278 | B1 * | 6/2002 | Liepe | 711/103 |
| 6,470,358 | B1 * | 10/2002 | Beyda et al. | 707/201 |
| 6,754,696 | B1 * | 6/2004 | Kamath et al. | 707/999.003 |
| 7,702,830 | B2 * | 4/2010 | Brunet et al. | 711/161 |
| 2003/0115226 | A1 * | 6/2003 | Gopalan | 707/205 |
| 2004/0230817 | A1 * | 11/2004 | Ma | 713/193 |
| 2006/0020637 | A1 * | 1/2006 | Kedem | 707/200 |
| 2007/0028138 | A1 * | 2/2007 | Noya et al. | 714/6 |
| 2007/0136340 | A1 * | 6/2007 | Radulovich | 707/101 |
| 2007/0239929 | A1 * | 10/2007 | Chen et al. | 711/103 |
| 2008/0209143 | A1 * | 8/2008 | Takahashi | 711/162 |

\* cited by examiner

*Primary Examiner* — Michael Krofcheck
(74) *Attorney, Agent, or Firm* — Campbell Stephenson LLP (57) ABSTRACT

A method and apparatus for a virtual storage device is provided. In one example, data to be stored at a removable storage device is received. A virtual storage agent is executed on the removable storage device. An interlace is established with at least one remote storage location. The data is stored at the at least one remote storage location. In another example, a request to access data associated with a removable storage device is received. A virtual storage agent on the removable storage device is executed. An interface is established with at least one remote storage location. The data is fetched from the at least one remote storage location.

24 Claims, 2 Drawing Sheets

METHOD AND APPARATUS FOR A VIRTUAL STORAGE DEVICE

BACKGROUND OF THE INVENTION

1. Field of the Invention

The present invention generally relates to computers and, more particularly, to techniques for accessing, saving and operating on files and/or blocks of data using a virtual storage device.

2. Description of the Background Art

Removable storage devices are typically portable devices that users can transport from place to place. Most removable storage devices can store a vast array of user data or files such as electronically stored documents, spread sheets, digital music, digital videos, digital photos, contact lists, electronic mail, applications, as well as other electronically stored data. Removable storage devices available in the market place include, for example and for illustrative purposes only, those products distributed under the trademark names THUMB-DRIVE, FLASHDRIVE, IPOD, and the like. Other removable storage devices include, but are not limited to and are presented for illustrative purposes only, compact disk drives, digital video disk drives, and many variations of hard drives, mini-drives, micro-drives, and the like.

Many users transport their removable storage devices from place-to-place and/or computer-to-computer so their files and applications are always with them. If however, the removable storage device is lost, stolen, or damaged, all the files resident on the device might be lost to the user as many users do not backup their data or have not had the opportunity to back up their data to another storage device. If the removable storage device is lost or stolen, the data on the storage device might be accessed by others, potentially exposing the user to identity theft, intellectual property security breach, or other data security breaches. Also, these portable devices are limited in space to the size of the device. There is a need, therefore, to address the above-mentioned problems.

SUMMARY OF THE INVENTION

A method and apparatus for a virtual storage device is provided. In one embodiment, data to be stored at a removable storage device is received. A virtual storage agent is executed on the removable storage device. An interface is established with at least one remote storage location. The data is stored at the at least one remote storage location. In another embodiment, a request to access data associated with a removable storage device is received. A virtual storage agent on the removable storage device is executed. An interface is established with at least one remote storage location. The data is fetched from the at least one remote storage location.

Another aspect of the invention relates to providing virtual storage for a plurality of removable storage devices. A virtual storage agent on each of the plurality of removable storage devices is executed to interface with at least one remote storage location using at least one computer. First data is stored at the at least one remote storage location. Second data is cached at each of the plurality of removable storage devices. The second data at each of the plurality of removable storage devices is synchronized with the first data at the at least one remote storage location.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

A method and apparatus for storing and/or accessing at least a block of data to/from a remote storage location using a removable storage device is provided. The method and apparatus allow users to access user data from any computer with access to the remote storage location without saving the user data to either the computer or removable storage device. The term "user data" or simply "data" is meant to encompass one or more files or parts of files. In particular, files stored on a block-based storage device comprise one or more blocks. The term "data" is also meant to encompass blocks comprising files or parts of files. The method and apparatus present a user with a virtual local drive where all the user data may be stored on the remote storage location. The virtual local drive is also configured to cache some of the user data stored on the remote storage location. In one or more embodiments, every block of the user data may be erasure encoded and stored on a plurality of remote storage locations. Erasure encoding ensures that only m of n storage locations need to be accessible in order to restore a given block of data. The remotely stored user data may be encrypted. The cached user data on the virtual local drive may also be encrypted.

Figure 1:
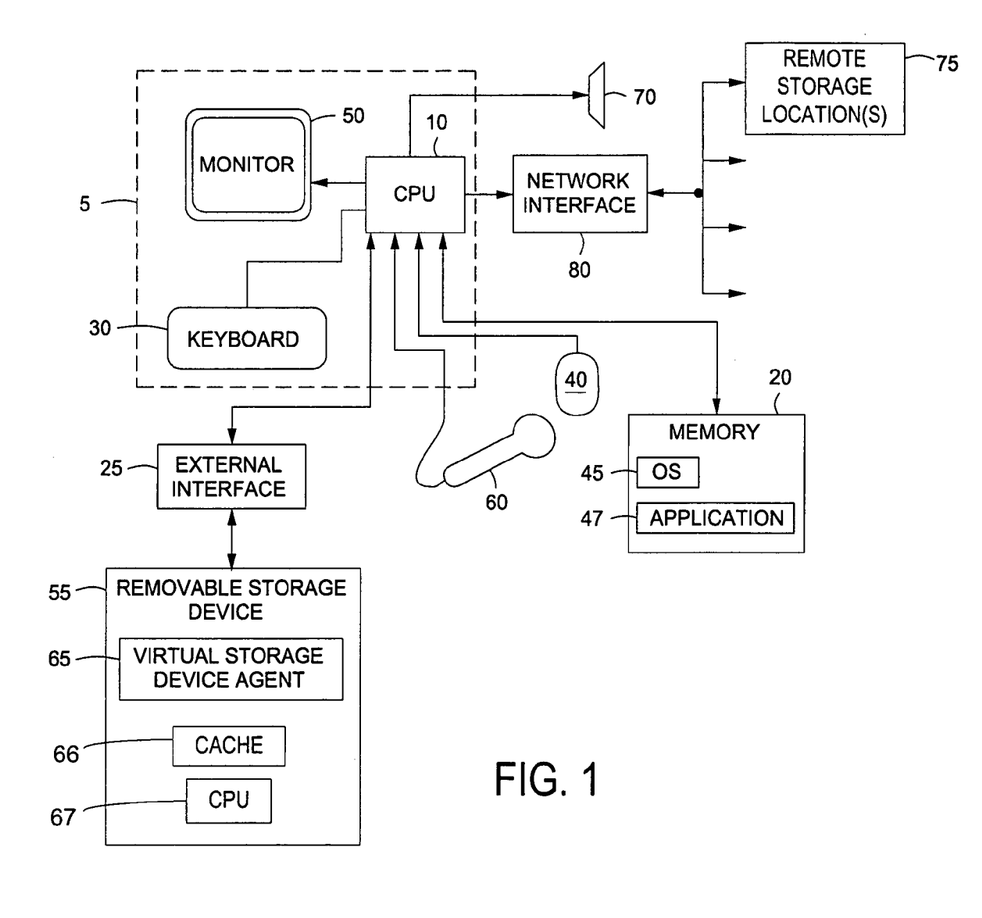
FIG. 1 depicts a representative computer system used to perform at least one embodiment of the invention.

FIG. 1 depicts a representative computer system 5 used to perform at least one embodiment of the invention. Those skilled in the art will understand that there are many computer systems configurations and variations and it should be understood that the computer system 5 presented in FIG. 1 is not meant to limit the configurations within which the many embodiments, as described herein, may be employed. The computer 5 may include a central processing unit (CPU) 10, an input device or keyboard 30, and a monitor 50 on which a software package according to one or more embodiments described herein may be executed. The computer 5 may also include a memory 20 as well as additional input and/or output devices, for example a network interface 80, mouse 40, a microphone 60, and a speaker 70. The computer system 5 may interface with external databases, remote storage locations 75, or the internet via the network interface 80. The computer 5 may interface with removable storage devices 55 via the external interface 25. It should be understood that the terms "network interface" and "external interface" do not indicate a limitation to interfaces that use only Ethernet connections and refers to all possible network interfaces, wired or wireless. For example, the network interface 80 and external interface 25 may include a Personal Computer Memory Card International Association (PCMCIA) connection, Peripheral Component Interconnect (PCI) connection, PCI Express connection, Universal Serial Bus (USB) port, IEEE 1394 or "FIREWIRE" port, a wireless connection using any of the previously listed connections or other wireless technologies, or other computer interface technology known in the art or that may be available in the future.

It should be understood that even though the computer system 5 is shown as a platform on which the methods described may be performed, the methods described may be performed on any platform where users may interact with internet sites or service providers. For example, the many and varied embodiments described herein may be used on any device that has computing capability where users interact with remote storage locations, service providers, or internet sites. These devices may include but are not limited to and are presented for illustrative purposes only, distributed computer networks, hand held PCs, laptops, devices sold under the trademark names BLACKBERRY or PALM, cellular phones, hand held music players, or any other device or system upon which a user may interact with remote storage locations, service providers, or internet sites.

In addition, various embodiments are described herein with respect to a removable storage device. The removable storage device may be any type of device capable of storing data and being connected and disconnected from a device with computing capability, including hand held PCs, laptops, personal digital assistants (PDAs), digital music playing devices, cellular telephone devices, and any of a myriad of other type of devices capable of storing data. In addition, the removable storage device described herein is meant to encompass other types of "removable storage" that may be implemented by a generally non-removable device. Such removable storage may include a file share on a disk drive, such as a common internet file system (CIFS) or a network file system (NFS) share. Such a file share may be temporally connected to a computer and is thus deemed to be "removable storage".

Referring again to FIG. 1, computer programs may be stored in the memory 20 and/or the removable storage device 55 and the central processing unit 10 may work in concert with at least the memory 20, the input device 30 and the output device 50 to perform tasks for the user. For example, a user may create and/or manipulate files such as word processing files, spread sheets, digital music, digital videos, digital photos, contact lists, electronic mail, as well as other electronically stored files. In one or more embodiments, the central processing unit 10 may work in concert with the memory 20, the removable storage device 55, the input device 30 and the output device 50 to perform tasks for the user. In some embodiments, the removable storage device 55 includes a CPU 67 to perform tasks for the user. The CPU 67 may cooperate with the CPU 10 and/or operate independently from the CPU 10.

In one or more embodiments, the memory 20 includes any number and combination of memory devices, without limitation, as is currently available or may become available in the art. In one or more embodiments, memory devices include without limitation, and for illustrative purposes only: hard drives, disk drives, random access memory, read only memory, electronically erasable programmable read only memory, flash memory, thumb drive, and any other memory device. Those skilled in the art are familiar with the many variations that may be employed using memory devices and no limitations should be imposed on the embodiments herein due to memory device configurations and/or algorithm prosecution techniques.

The memory 20 may store at least an operating system (OS) 45 and an application 47. The operating system 45 facilitates control and execution of software, such as the application 47 and a virtual storage device agent 65, using the CPU 10. Any of the available operating systems may be used in this manner including WINDOWS, LINUX, Apple OS, UNIX, related server operating system versions of each respective operating system, and the like. The removable storage device 55 may store at least the virtual storage device agent 65 that may assist at least one user in accessing and saving data. In one or more embodiments, the data are generated using at least one application, such as the application 47. The memory 20 and removable storage device 55 may be used in concert with computer 5 and the network interface 80 to save and/or access data to/from the remote storage location 75. For example, when a user requests access to data stored on the remote storage location 75, the CPU 10 may execute the virtual storage device agent 65 to establish an interface with the remote storage location 75 and subsequently retrieve the desired data from the remote storage location 75. Alternatively, the virtual storage device agent 65 may be executed by the CPU 67 in the removable storage device, rather than the CPU 10.

In one or more embodiments, the remote storage location 75 may be a server or a plurality of servers. The remote storage location 75 may include an array of memory modules, such as an array of disk drives. The remote storage location 75 may be provided by a remote storage provider. For example, a remote storage provider could provide electronic storage facilities or user storage areas where the user may remotely access and store data using one or more embodiments described herein. The remote storage provider may provide their storage facilities for free, for a fee and/or as part of a broader package of other user services.

In one or more embodiments, the virtual storage device agent 65 may provide a virtual local drive on the removable storage device 55. All the blocks of the virtual drive may be stored remotely via network interface 80 to a remote storage location 75. In one or more embodiments, all the files on the virtual drive may appear as if they are stored directly on the removable storage device 55 and the user may read, write, modify, add, and/or delete the files or parts of the files as if the files were stored directly on the device 55. In one or more embodiments, once the device 55 is removed from the computer 5, no data from the virtual local drive is left on the computer 5 or in the memory 20. Some or all of the files stored at the remote storage location 75 may be cached on the device 55 in a cache 66. Thus, if the device 55 is removed from the computer 5, a user may access such files without having access to the remote storage location 75.

In one or more embodiments, some metadata associated with the files stored on the remote storage location 75 may be stored on the device 55 (e.g., in the cache 66). This allows a user of the device 55 to see the totality of the files, including files not currently cached on the device 55, but stored at the remote storage location 75. In one or more embodiments, the next time the user installs the removable storage device 55 in a computer, for example the computer 5, the user may be presented with at least a listing of file specific information as if the files were actually stored on the removable storage device 55. For example, when the removable storage device 55 is installed on the computer 5, a folder may be displayed containing the file names of all the files stored on the remote storage location 75. The user may select any file from the displayed folder, the agent 65 may establish an interlace with the remote storage location 75 and the appropriate blocks may be fetched for use as if the files were stored directly on the device 55.

In one or more embodiments, a user may create and/or modify files or parts of files on the device 55 without having access to the remote storage location 75. The next time the user installs the removable storage device 55 in a computer, for example the computer 5, the newly created and/or modified files or parts of files are synchronized with the remote storage location 75. That is, blocks associated with newly created files are uploaded to the remote storage location 75, and blocks associated with modified files replace the previous versions of such blocks at the remote storage location 75.

In one or more embodiments, access to the removable storage device 55 and/or the remote storage location 75 may be controlled by an access control protocol. For example, an access control protocol may be employed to protect the user data if the removable storage device 55 is lost or stolen. A user may be required to enter a username and password to access the removable storage device 55. The user may be required to enter a separate username and password for access to the remote storage location 75. The user may be required to enter only one password for access to both the removable storage device 55 and the remote storage location 75. In one or more embodiments, the user may be required to use individual biometrics, such as a finger print or retinal scan, to gain access to the removable storage device 55 and/or remote storage location 75. It should be understood that the access control protocol may be employed in any fashion, without limitation, including not requiring any user name or password at all.

In one or more embodiments, every data block may be erasure encoded and stored in a plurality of remote storage locations 75. For example, erasure encoding may ensure that only M of N remote storage locations 75 need to be accessible in order to restore a given block of data. In one or more embodiments, the remotely stored files may be encrypted. In one or more embodiments, all the files cached on the removable storage device 55 may be encrypted.

Figure 2:
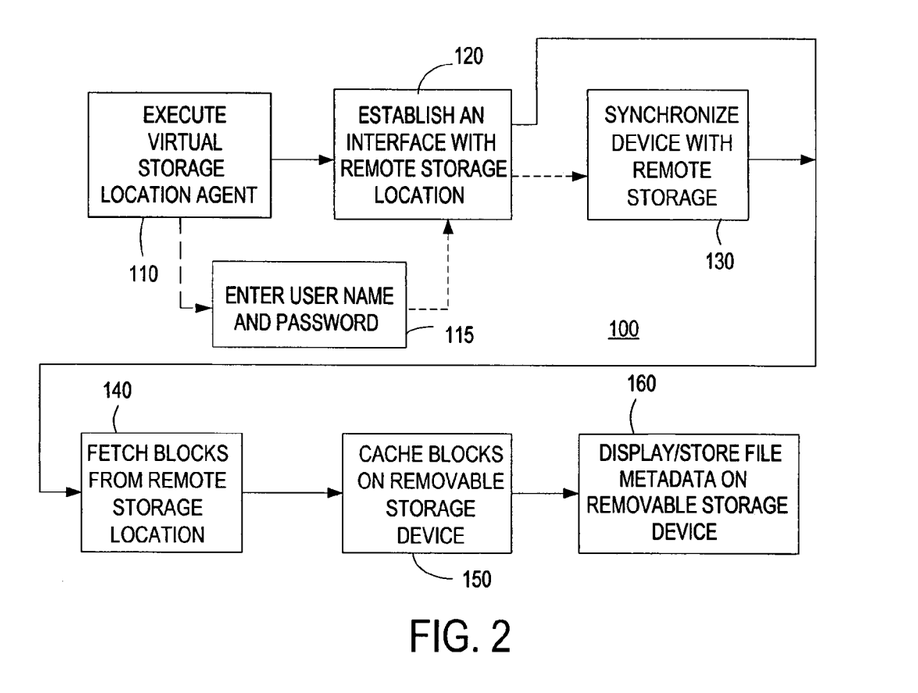
FIG. 2 depicts a flow diagram illustrating alternative embodiments of a method for accessing at least a block of data from a virtual storage device.

FIG. 2 depicts a flow diagram illustrating alternative embodiments of a method 100 for accessing data from a virtual storage device. In one or more embodiments, a request to access a remote storage location 75 is received. For example, a user may install a removable storage device 55 on a computer, a representation of files virtually stored on the device 55 may be displayed, and the user may select one or more files. If the files are not physically stored on the device 55 (i.e., in the device's cache), a request to access the remote storage location 75 is generated.

In one or more embodiments, at block 110, the virtual storage device agent 65 resident on a removable storage device 55 is executed. The agent 65 is executed in response to the request for files or parts of files not physically stored on the device 55. At block 120, the agent 65 may establish an interface with the remote storage location 75. In one or more embodiments, at block 115, the user may be prompted to enter a user name and password and/or other access control protocol information, prior to gaining access to the removable storage device 55 and/or remote storage location 75.

In one or more embodiments, after an interface is established, the device 55 is synchronized with the remote storage location 75 at block 130. For example, blocks associated with newly created files cached in the device 55 while not connected to the remote storage location 75 may be uploaded to the remote storage location 75. Blocks associated with modified files cached in the device 55 may be changed at the remote storage location 75 accordingly. In addition, the device 55 may be caching data that has been modified at the remote storage location 75. Thus, blocks associated with modified files at the remote storage location 75 are changed at the device 55 accordingly. If synchronization is not required, the method 100 may proceed from block 120 to block 140.

At block 140, the agent 65 fetches at least one block of data from the remote storage location at block 130. The block or blocks correspond to the requested files or parts of files. At block 150, the block or blocks may be cached on the removable storage device 55. For example, the removable storage device 55 may be used for write-through caching. In one or more embodiments, whenever a file is accessed at block 140, the agent 65 may perform smart pre-fetching and caching of blocks at block 150 based on the assumption that files are stored sequentially and will be accessed sequentially, for example, as when playing a movie clip.

At block 160, file related metadata may be stored and/or updated on the removable storage device 55 to identify the files stored on the remote storage location 75. For example, file related metadata may include file path, file size, modify date, and/or file storage location data. In this way, a representation of the files stored on the remote storage location 75 may be available to the user on the removable storage device 55 without requiring an interface with the remote storage location 75. It should be understood that the multiple functional paths depicted in FIG. 2 are not inclusive of all the possible functional paths for the one or more embodiments herein described and no limitations should be imposed on the embodiments herein due to the depicted functional paths.

Figure 3:
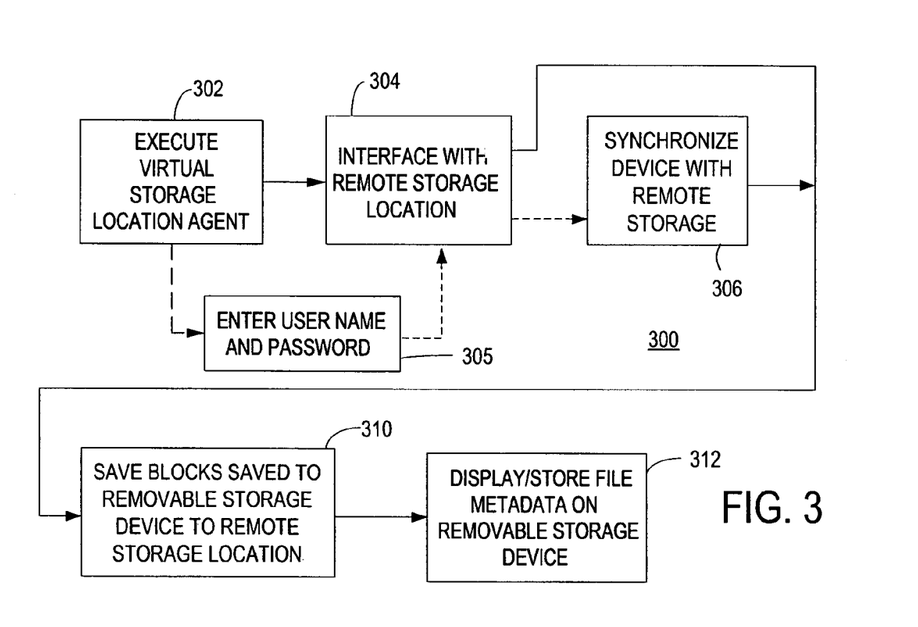
FIG. 3 depicts a flow diagram illustrating alternative embodiments of a method for saving at least a block of data to a virtual storage device.

FIG. 3 depicts a flow diagram illustrating alternative embodiments of a method 300 for saving at least a block of data to a virtual storage device. In one or more embodiments, a request to save a file to a remote storage location is received. For example, a user may create a file or files using a computer and application, such as the computer 5 and application 47 depicted in FIG. 1, examples of which are described above. Returning to FIG. 3, to save the file, the user may install a removable storage device 55, where the removable storage device 55 stores at least a virtual storage device agent 65. The user may store the file on the remote storage location 75 by selecting the removable storage device 55 as the location onto which the user wishes to store the file.

In one or more embodiments, at block 302, when the computer attempts to access the removable storage device 55, the virtual storage device agent 65 may be executed. At block 304, the agent 65 may establish an interface with a remote storage location 75. In one or more embodiments, at block 305, the user may be prompted to enter a user name and password and/or other access control protocol information, prior to gaining access to the removable storage device 55 and/or remote storage location 75.

In one or more embodiments, at block 306, the device 55 may be synchronized with the remote storage location 75. For example, blocks associated with newly created files cached in the device 55 while not connected to the remote storage location 75 may be uploaded to the remote storage location 75. Blocks associated with modified files cached in the device 55 may be changed at the remote storage location 75 accordingly. In addition, the device 55 may be caching data that has been modified at the remote storage location 75. Thus, blocks associated with modified files at the remote storage location 75 are changed at the device 55 accordingly. If synchronization is not required, the method 300 may proceed from block 304 to block 310.

At block 310, blocks sent to the removable storage device 55 to be saved are saved to the remote storage location 75. The removable storage device 55 may cache the blocks saved to the remote storage location 75. At block 312, file related metadata may be stored and/or updated on the removable storage device 55 to identify the files stored on the remote storage location 75. For example, file related metadata may include file path, file size, modify date, and/or file or block storage location data.

For purposes of clarity by example, embodiments of the invention are described above with respect to a single removable storage device 55 coupled to a computer 5. It is to be understood that the invention may be employed with multiple removable storage devices and/or multiple computers. For example, in some embodiments, a user or users may have a plurality of removable storage devices 55 that share online storage at the remote storage location 75. Each of the removable storage devices 55 includes a virtual storage device agent 65 that operates as described above. The user(s) may create and/or modify files or parts of files at the remote storage location 75 using one or more computers. As each of the removable storage devices 55 is coupled to a computer, the device is synchronized with the remote storage location 75, as described in the embodiments above. In this manner, data in the caches 66 of the devices 55 are consistent with data stored at the remote storage location 75.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While, for the purposes of disclosure there have been shown and described what are considered at present to be illustrative, example embodiments of the present invention; it will be appreciated by those skilled in the art that other uses may be resorted to and changes may be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention can be devised without departing from the basic scope thereof, and the scope thereof is determined by the claims that follow.

The invention claimed is:

1. A method comprising:
providing a first interface between a computer and a removable storage device that is external to the computer, wherein
the first interface enables first data access between the computer and the removable storage device;
receiving data from the computer using the first interface, wherein
the data is to be stored at the removable storage device;
caching the data on the removable storage device;
executing a virtual storage agent in response to the computer generating an access attempt to read another data, wherein
the virtual storage agent is stored on the removable storage device,
the access attempt is configured to read the another data from the removable storage device, and
executing the virtual storage agent comprises the computer executing the virtual storage agent in response to the another data not being stored on the removable storage device;
establishing a second interface with at least one remote storage location using the virtual storage agent, wherein
the at least one remote storage location is external to both the computer and the removable storage device, and
the executing the virtual storage agent comprises
using the computer to communicate, via the second interface, with the at least one remote storage location; and
storing the data at the at least one remote storage location using the second interface.

2. The method of claim 1, further comprising:
the virtual storage agent fetching the another data from the remote storage location to the removable storage device, wherein
the virtual storage agent performs the fetching using the second interface, and
returning the another data to the computer in accordance with the access attempt.

3. The method of claim 1, further comprising:
storing metadata associated with cached data that is cached on the removable storage device or stored at the at least one remote storage location, wherein the metadata comprises information describing at least whether the cached data is stored on the removable storage device, or at the at least one remote storage location.

4. The method of claim 1, wherein the second interface to the at least one remote storage location is controlled by an access control protocol.

5. The method of claim 1, wherein the at least one remote storage location comprises a plurality of remote storage locations, and the data is stored on the plurality of remote storage locations using erasure encoding.

6. The method of claim 1, wherein the data is encrypted and stored on one or more of:
the removable storage device, or
as stored at the at least one remote storage location.

7. The method of claim 1, further comprising:
synchronizing a portion of the data between the removable storage device and the at least one remote storage location, wherein
the synchronizing is performed prior to the storing, and
the synchronizing synchronizes one or more of
one or more first data blocks associated with one or more new files, wherein
the one or more new files are cached on the removable storage device,
one or more second data blocks associated with one or more modified files, wherein
the one or more modified files are cached on the removable storage device, or
one or more third data blocks that are stored by the at least one remote storage location.

8. The method of claim 1, further comprising:
providing a third interface between a second computer and the removable storage device that is external to the second computer, wherein the third interface enables data access between the second computer and the removable storage device;
receiving second data from the computer using the third interface, wherein the second data is to be stored at the removable storage device;
caching the second data on the removable storage device;
the second computer executing the virtual storage agent stored on the removable storage device in response to the second computer generating an access attempt for another data;
establishing a fourth interface with the at least one remote storage location using the virtual storage agent, wherein the at least one remote storage location is external to the second computer; and
storing the second data at the at least one remote storage location using the fourth interface.

9. The method of claim 1, wherein
the computer executing the virtual storage agent comprises the virtual agent executing on the computer.

10. The method of claim 1, wherein
the computer executing the virtual storage agent comprises
the computer initiating execution of the virtual agent, and
the virtual agent executes on the removable storage device.

11. The method of claim 1, wherein
the second interface enables second data access between the removable storage device and the at least one remote storage location computer, and
the second data access is performed using the computer.

12. The method of claim 1, wherein
the storing the data at the at least one remote storage location using the second interface comprises the virtual agent accessing the at least one remote storage location using the computer.

13. A method comprising:
receiving a request from a computer to read first data associated with a removable storage device, wherein
the computer is external to the removable storage device,
the request is configured to read the first data from the removable storage device, and
the removable storage device is operable to cache data received from the computer;
determining if the first data is cached on the removable storage device;
the computer executing a virtual storage agent stored on the removable storage device in response to determining that the first data is not cached on the removable storage device;
establishing an interface with at least one remote storage location that is external to both the computer and the removable storage device using the virtual storage agent, wherein
the executing the virtual storage agent comprises
using the computer to communicate, via the interface, with the at least one remote storage location; and
the virtual storage agent fetching the first data from the at least one remote storage location to the removable storage device using the interface.

14. The method of claim 13, wherein the data as cached at the removable storage device is encrypted.

15. The method of claim 13, further comprising:
storing metadata associated with at least data cached on the removable storage device.

16. The method of claim 13, wherein the interface to the at least one remote storage location is controlled by an access control protocol.

17. The method of claim 13, wherein additional data is cached on the removable storage device, and the method further comprises:
synchronizing the additional data between the removable storage device and the at least one remote storage location, and
returning the first data to the computer in accordance with the request.

18. The method of claim 13, further comprising:
receiving a request from a second computer external to the removable storage device to access second data associated with the removable storage device;
determining if the second data is cached on the removable storage device;
the computer executing the virtual storage agent stored on the removable storage device in response to a determination that the second data is not cached on the removable storage device;
establishing another interface with the at least one remote storage location that is external to the second computer using the virtual storage agent; and
fetching the data from the at least one remote storage location using the another interface.

19. An apparatus comprising:
a removable storage device configured to use a first interface between a computer and the removable storage device that is coupled to an external computer, wherein
the first interface is configured to enable at least a transfer of data and requests between the computer and the removable storage device,
the removable storage device is configured to receive first data using the first interface from the computer for storage at the removable storage device, the removable storage device is further configured to receive an access request using the first interface from the computer to read second data,
the access request is configured to read the second data from the removable storage device, and
the removable storage device comprises:
a cache for caching data, and a virtual storage agent operable to be executed by the computer in response to the computer generating the access request, wherein the virtual storage agent is configured to:
- determine if the second data referred to by the access request is stored in the cache,
- in response to determining that the second data is not stored in the cache, establish a second interface with at least one remote storage location that is external to both the computer and the removable storage device,
- store the first data at the at least one remote storage location using the second interface, wherein the virtual storage agent is configured to perform the storing using the computer,
- store metadata describing the first data stored at the at least one remote storage location using the second interface, and
- fetch the second data from the at least one remote storage location using the second interface.

20. The apparatus of claim 19, wherein the cache is configured to perform the storing of metadata associated with at least the first data and the second data cached on the removable storage device.

21. The apparatus of claim 19, wherein the virtual storage agent is further operable to be executed by another computer that is external to the removable storage device when the removable storage device is coupled to the another computer and in response to the another computer generating an another access request for third data, and the virtual storage agent configured to:
- determine if the third data referred to by the another access request is stored in the cache,
- in response to a determination that the third data is not stored in the cache, establish a third interface with the at least one remote storage location that is external to the another computer,
- store the third data at the at least one remote storage location using the third interface,
- store metadata describing the third data stored at the at least one remote storage location using the third interface, and
- fetch the third data from the at least one remote storage location using the third interface.

22. A method comprising:
a computer executing a virtual storage agent to interface with at least one remote storage location, wherein
- the virtual storage agent is stored on at least one of a plurality of removable storage devices,
- each of the removable storage devices is external to the computer,
- the at least one remote storage location is external to the removable storage devices and the computer,
- the computer is executing the virtual storage agent in response to a request to read a set of data,
- the request is configured to read the set of data from the removable storage device, and
- the set of data comprises a first data and a second data;

determining if the set of data referred to by the request is cached on the removable storage devices;

in response to a determination that the set of data is not cached on the removable storage devices,
- storing the first data at the at least one remote storage location, wherein the storing is performed using the virtual storage agent,
- caching the second data at each of the plurality of removable storage devices, and
- synchronizing the second data at each of the plurality of removable storage devices with the first data at the at least one remote storage location.

23. The method of claim 22, wherein the step of synchronizing comprises:
- creating or updating blocks of the first data at the at least one remote storage location in response to a new portion or a changed portion of the second data cached by one or more of the plurality of removable storage devices; and
- creating or updating blocks of the second data cached by one or more of the plurality of removable storage devices in response to a new portion or a changed portion of the first data at the at least one remote storage location.

24. The method of claim 22, wherein the at least one computer comprises a plurality of computers, and the second data at each of the plurality of removable storage devices is synchronized with the first data at the at least one remote storage location using the plurality of computers.

* * * * *

UNITED STATES PATENT AND TRADEMARK OFFICE
CERTIFICATE OF CORRECTION

PATENT NO. : 8,510,505 B1  
APPLICATION NO. : 11/713317  
DATED : August 13, 2013  
INVENTOR(S) : Hans Van Rietschote et al.

Page 1 of 1

It is certified that error appears in the above-identified patent and that said Letters Patent is hereby corrected as shown below:

On the Title Page

On page 1, item (75) Inventors, delete "Hans van Reitschote" and insert --Hans van Rietschote--.

On page 1, item (57) in the Abstract, line 4, please delete "interlace" and insert --interface--.

Signed and Sealed this
Eleventh Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,510,505 B1
APPLICATION NO.   : 11/713317
DATED             : August 13, 2013
INVENTOR(S)       : Hans van Rietschote et al.

Page 1 of 1

It is certified that error appears in the above-identified patent and that said Letters Patent is hereby corrected as shown below:

On the Title Page

On page 1, item (12), delete "van Reitschote, et al." and insert --van Rietschote, et al.--.

On page 1, item (75) Inventors, delete "Hans van Reitschote" and insert --Hans van Rietschote--.

On page 1, item (57) in the Abstract, line 4, please delete "interlace" and insert --interface--.

This certificate supersedes the Certificate of Correction issued February 11, 2014.

Signed and Sealed this
Eighteenth Day of March, 2014

Michelle K. Lee
*Deputy Director of the United States Patent and Trademark Office*